(No Model.)
L. W. SPENCER.
LATHE.
No. 356,509. Patented Jan. 25, 1887.
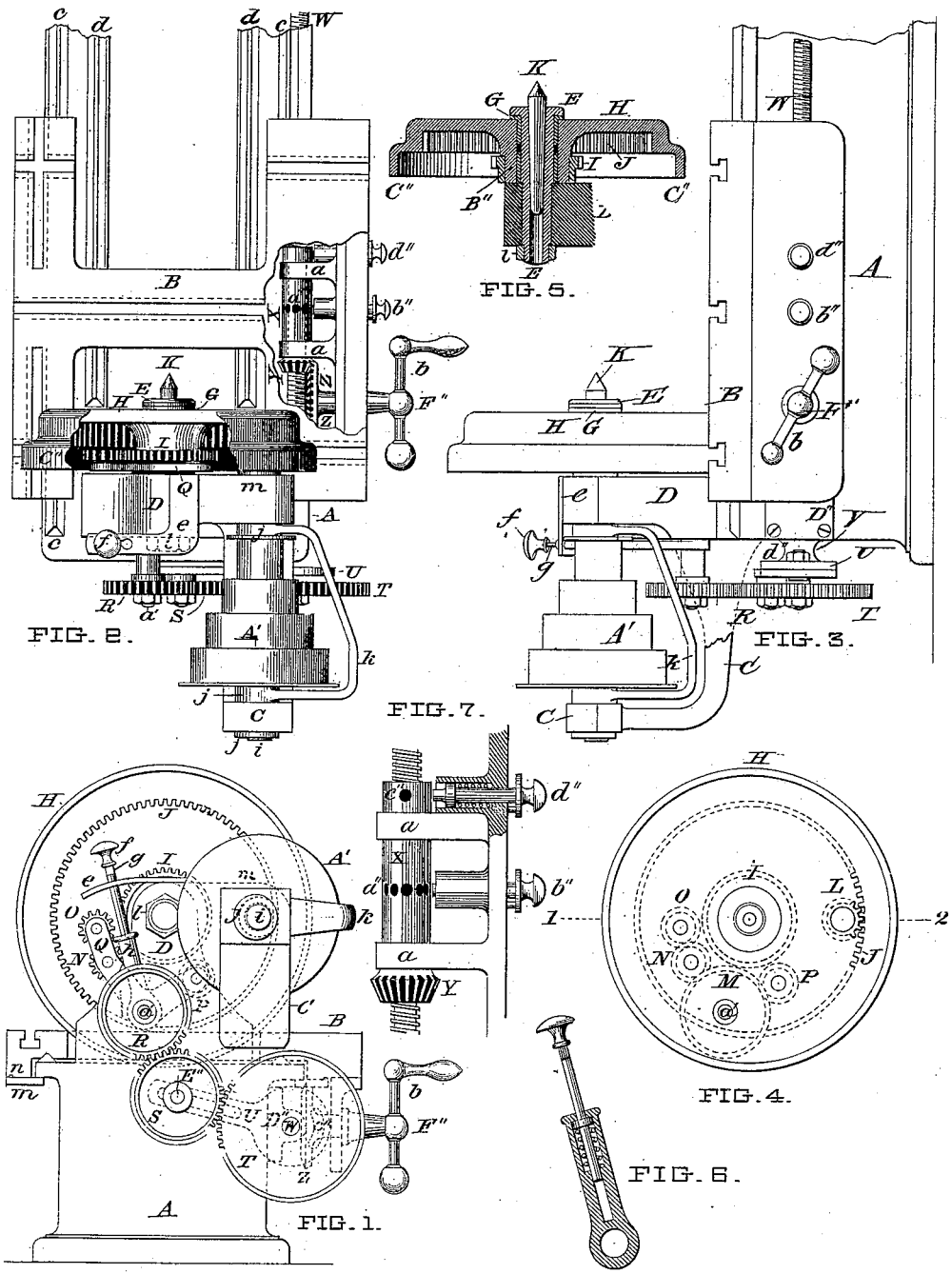
WITNESSES:
M. C. Huling
S. L. Wright
INVENTOR:
LEWIS W. SPENCER.
by Franklin Scott, Attorney.

United States Patent Office.

LEWIS W. SPENCER, OF HOOSICK FALLS, NEW YORK.

LATHE.

SPECIFICATION forming part of Letters Patent No. 356,509, dated January 25, 1887.

Application filed October 12, 1885. Serial No. 179,673. (No model.)

*To all whom it may concern:*

Be it known that I, LEWIS W. SPENCER, of the village of Hoosick Falls, in the county of Rensselaer and State of New York, have invented certain Improvements in Engine-Lathes, of which the following description, in connection with the accompanying sheet of drawings, constitutes a specification.

This invention relates to special construction and arrangement of details of that variety of engine-lathes more particularly adapted to and fitted for boring purposes, and for doing other analogous work, and differs from existing machines employed for such service, among other things, in the following particulars: The head-stock which supports the spindle and driving-pinion shaft, is cast integral with the bed of the lathe, whereby the maximum of strength and inflexibility of the foundation structure is attained. The spindle which supports and drives the carrier, and in which the lathe-center (which in this lathe takes the place of the old live-center) is inserted, is a hollow dead-spindle accurately fitted and pressed into its seat in the head-stock and firmly secured therein. The end of this spindle projects on the work side of the head-stock a sufficient distance to receive and form a bearing for the carrier. This carrier is practically a plain rotating disk with a hub centrally bored and fitted to revolve upon the end of the dead-spindle, and has a peripheral concentric flange upturned about its edge, as hereinafter shown, which disk and flange, so made, constitute a shield or receptacle for all the driving-gears. It also carries a concentric internal gear, through which it receives motion from the cone-pulleys and driving-pinion, as shown. The feed and screw-cutting movements are obtained by means of a screw extending the length of the lathe in front and running in a long rotatable nut mounted in bearings beneath or inside of the sliding rest or the apron depending therefrom. This rotatable nut has a bevel pinion-gear at one end which engages with and is actuated by another bevel-gear on a crank-shaft, with crank on the outside of the rest-apron. When the feed-gears are thrown out, the slide-rest may be operated by the hand-crank. The nut has a concentric series of perforations or indentations about one portion of its cylindrical surface, and a spring bolt or catch is attached to the slide-rest to co-operate therewith for arresting the rotation of the nut when it is desired to drive the rest by the screw; and it is also provided with a single notch-hole or indentation at another portion of its periphery, with which an appropriate spring-bolt catch or detent co-operates to lock the nut in the same position as to its rotation wherever it may stop or start in the length of the screw. This latter provision is for screw-cutting. In order to utilize the greatest proportion of the length of the bed possible, an arm or bracket is cast upon and with the bed at the head-stock end, which extends laterally out beyond the bed or base and supports the outer end of the cone-spindle. The position of the cone-spindle is on the same side of the main spindle as the cutting-tool. Special advantages accrue from this feature of position, as a large amount of strain and leverage on the main spindle, or on its center, are removed, thus removing or greatly diminishing friction and prolonging the life of the machine.

A special device is provided for locking the driving-gear either in or out of action.

The drawings fully illustrate my invention, wherein—

Figure 1 exhibits an end elevation of my improved lathe. Fig. 2 shows a plan view of same. Fig. 3 shows a front elevation of the same. Fig. 4 exhibits a detail showing position and arrangement of driving-pinion and position and arrangement of the feed-driving gears within the carrier. Fig. 5 is a sectional view on line 1 2 of Fig. 4, through the axis of the dead-spindle, showing construction and adjustment of dead-spindle and carrier. Fig. 6 shows a detail view of the locking device for the feed-gears. Fig. 7 is a detail of the construction of the feed-nut and its attachments.

I carry out my invention by constructing a bed, A, having its head-stock D for receiving and supporting the dead-spindle and carrier, and also the inner bearing of the cone-pulley shaft and bracket-arm C, which supports the outer bearing of the cone-pulley shaft, cast integral therewith, with a view of securing strength and rigidity, as well as to cheapen construction. The head-stock, it will be observed, is erected over the extreme end of the bed, and is of quite limited thickness, having in fact only sufficient thickness to afford a bored seat for the hollow spindle of sufficient length to insure firmness and absolute rigidity to the spindle when forced home into its seat. The head-stock D extends toward the front of the lathe, as shown at m, sufficiently to afford a bearing to the inner end of the cone-shaft and the bearing in which it revolves. The bracket C projects from the end of the bed, and has an upturned arm, which carries the bearing in which the opposite end of the cone-shaft is seated. The cone-spindle i, carrying a pinion-gear, which acts as the driver of the carrier, is mounted in rotatable eccentric journal-boxes j j, which in turn have bearings in the top of head-stock D, at m, and of bracket C. These journal-boxes j j are united by a bail, k, which may be revolved or swung from a horizontal position, as in Fig. 1, down and backwardly sufficiently to throw the driving-pinion L, which is carried on its internal end and meshes with internal gear, J, out of engagement therewith. The head-stock D is bored for the reception of the hollow spindle E, as seen in Fig. 5, and the spindle is fitted to be pressed firmly into its seat, and is secured therein, if necessary, by the nut l. The spindle E is shouldered at the inner face of the head-stock to secure its accurate adjustment and seat it firmly. Its projection beyond the inner face of the head-stock supplies the journal-stud upon which the carrier H revolves. It is bored with a tapering hole for the reception of a dead-center, K.

The carrier consists of a disk having a large concentric hub, B'', which is bored and lined with an anti-friction lining, G, and accurately fitted to revolve on the spindle E. Its face may be provided with holes, slots, &c., so as to operate like an ordinary face-plate, or it may carry appliances for the attachment of chuck or other analogous tools. It carries on its back side the internal gear, J, which is preferably cast integral with the carrier, and also has a peripheral enshrouding flange, C''. Upon its hub B'' the feed-driving gear I is fitted and keyed or otherwise secured. This gear I imparts motion through the intermediate gears, O and N or P, to the gear M, which is mounted on the inner end of a shaft, a', which revolves in a sleeve-bearing extending through head-stock D, as seen in Fig. 6. The sleeve-bearing has the socket-lever h affixed to its outer end between gear R and the head-stock, and upon its inner end it carries an elbow-shaped arm, Q, which has two limbs. The longer one supports two intermediate gears, O and N, while the shorter carries but one, P. Gears O and P are so arranged that when the sleeve-bearing is rocked in its seat by means of lever f like motion is imparted to elbow Q, and one or the other of said gears is thrown into engagement with driving-gear I. By these means either a direct or a reverse feed movement is imparted to the feed-screw W through the train of gears M R S T, according as intermediate P (for the direct) or O and N (for the reverse motion of the screw) is or are thrown into gear with driver I.

Shaft a' revolves in a sleeve which has a socket-arm, h, attached to its outer end, within which the lever f plays up and down. This socket also carries a spring, the office of which is to force lever f upwardly. Just beneath the handle at the upper end of the lever the same is flattened. This lever plays through a slot in the locking-plate e. This slot is just wide enough to permit the lever f to be thrown forward and back when it is thrust down, so the flattened portion thereof, just beneath the handle, shall coincide with the slot. At the extremities of the slot and midway between the ends of the same it is bored or enlarged to conform to the shape and size of the lever below the flattened portion thereof, so that when the spring, acting against the lever, throws it upwardly the larger part of the same below the flattened part will enter one of the enlargements of the slot, thus confining the lever therein and locking it, so that it cannot be thrown forward or back without depressing the same so that its thinnest or flattened part shall enter the slot.

Feed-screw W revolves in journal-boxes attached to the bed in any of the usual ways, and carries on its head end provisions for receiving one of the series of change-gears. Behind this is mounted a slotted swinging arm, U, which has a concentric slot, c'', in the disk-shaped head, whereby it is pivoted on the end of the screw, through which a bolt, d'', passes, whereby said arm may be bolted to the bracket V of the journal-box D''. The slotted arm U carries an adjustable stud, E'', for the attachment of an intermediate change-gear.

The various combinations of change-gears are made on shafts a' and W.

The rotatable feed-nut X revolves in bearings a a, projecting from or connected with the slide-rest. This nut carries at one end a bevel-gear, Y, which engages with another bevel-gear, Z, on the crank-shaft F'', and also has the circumferential series of holes or indentations a'', which afford means, in connection with spring bolt or catch b'', for locking the nut in any desired position. This series of holes or indentations is profusely graduated, so that the spring-bolt may be thrown in at any point of its periphery, by which means the feed movement may be started with the greatest promptness. Said nut is also provided at another point in its length with a single hole or indentation, c'', which co-operates with another spring bolt or catch similar to the one last mentioned. This provision is designed for use in screw-cutting and similar work, where it becomes necessary for the lathe-tool to retrace its original cut a number of times. In screw-cutting the latter-described index alone is used to the exclusion of the former. When the lathe is adjusted and bolt is thrown in, the feed proceeds regularly until the tool reaches the end of the thread, at which point spring-bolt $d''$ is thrown out. When this is done, the rest is run back by means of hand-crank $b$ to any point back of the starting-point. This may be done without stopping or reversing the motion of the feed-screw—a feature not found in existing systems. After the rest has been so run back, the spring-bolt may be thrown in, and from the fact that the index with which it co-operates has but one graduation or notch with which it can engage, it follows that the screw and tool must occupy the same relation to each other that they did when the tool made its last previous traverse over the work.

These provisions and mode of operation avoid all difficulties and defects which ordinarily accrue from lost motion in the train of gears, backlash of gears, and slack of all description.

I claim as my invention—

1. The combination of a removable stationary hollow spindle seated in the head-stock of an engine-lathe or boring-engine, and a carrier for holding and driving work mounted and adapted to rotate upon the projecting end of said spindle, with provisions, substantially as shown, for driving said carrier, substantially as specified.

2. An engine-lathe having the axis of the pinion which drives the face-plate or work-carrier located on the same side of the axis of motion of the work as the cutting-tool.

3. The combination of the cone-pulley driving-shaft, carrying the pinion which drives the carrier, with the rotatable eccentric journal-bearings mounted in stands on the lathe-bed or head-stock and connected by a bail so as to be capable of simultaneous rotation, substantially as described and set forth.

4. The provisions shown for reversing the motion of the feed-screw, consisting of the gear on the axis of the carrier, the intermediate gears, N O P, mounted on the oscillating elbow Q, and the gear M on shaft $a'$, revolving about the axis of oscillation of elbow Q, in combination with the train of gears between gear M and the gear on the end of the feed-screw, and appliances attached to shaft $a'$, whereby the elbow Q may be oscillated, substantially as specified.

5. The combination, in an engine-lathe or boring-engine, of a longitudinal rotating feed-screw with a rotatable nut fitted and adapted to rotate in bearings attached to the slide-rest and having a concentric series of holes, notches, or indentations in connection with a locking device attached to slide-rest or its apron, whereby the said nut may be locked in any stage of its revolution, substantially as described and set forth.

6. The combination of the longitudinal rotating feed-screw, the rotatable nut in which it works, adapted to revolve in bearings connected with the slide-rest, a hand crank-shaft, and crank connected with the slide-rest carrying a bevel-gear which engages with a pinion on the rotatable nut aforesaid as a means for propelling the slide-rest in either direction independently of the rotation of the feed-screw, substantially as described and set forth.

7. In an engine-lathe, a rotating feed-screw arranged parallel with the slide-rest ways working in a rotatable nut which is mounted and adapted to revolve in bearings connected with the slide-rest, said nut being provided with a single notch or graduation, in combination with a locking device connected with the slide-rest or its apron, and adapted to engage with such notch or graduation to hold the nut in a fixed position with reference to the slide-rest as a means for facilitating screw-cutting.

8. In an engine-lathe, a rotating feed-screw arranged parallel with the slide-rest ways working in a rotatable nut which is mounted and adapted to revolve in bearings connected with the slide-rest, said nut being provided throughout its entire circumference with a concentric series of notches, holes, or indentations, in combination with a locking device adapted to engage with such notches, holes, or indentations at any stage of its revolution as a means of promptly throwing the feed mechanism into operation, substantially as specified.

9. The combination of the rotatable feed-screw attached to the bed of the lathe and the rotatable nut revolving in bearings connected with the slide-rest, through which said screw works, with a locking device attached to the slide-rest and adapted to engage with the rotatable nut, whereby the rotation of the nut may be arrested and the nut held in fixed relation with the screw, substantially as described, and for the purposes set forth.

10. A lathe-bed having a head-stock cast integral therewith, fitted with a removable stationary hollow spindle and a dead-center inserted therein.

In testimony whereof I have hereto subscribed my name, at Hoosick Falls, New York, this 27th day of August, A. D. 1885.

LEWIS W. SPENCER.

In presence of—
L. BURKE BALL,
JAMES WADDELL.